July 6, 1954  S. BECKWITH  2,683,227
ELECTRICAL APPARATUS WITH FLUID COOLED TERMINAL BUSHING
Filed May 16, 1952
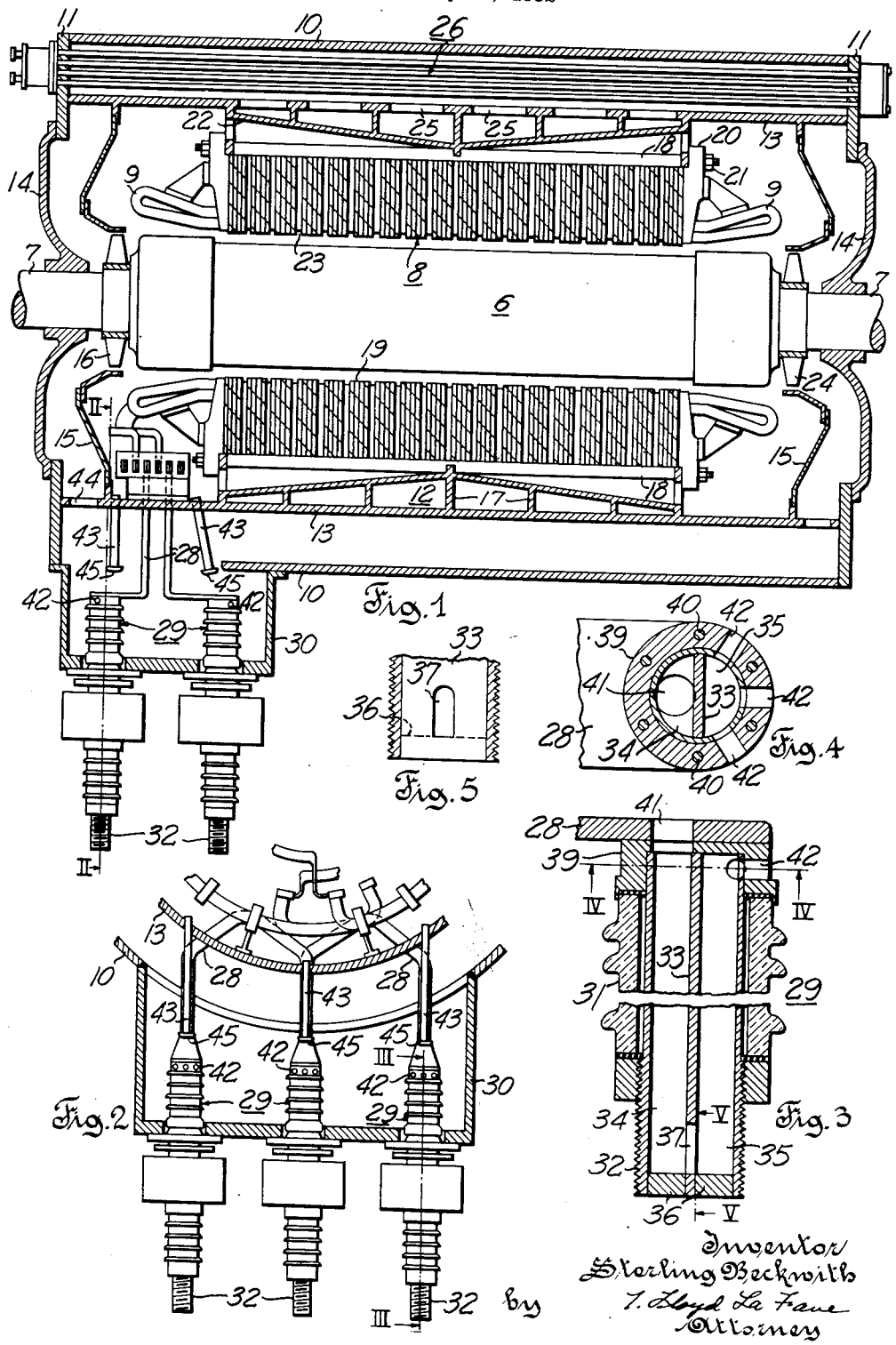
Inventor
Sterling Beckwith
T. Lloyd La Fave
Attorney Patented July 6, 1954

2,683,227

UNITED STATES PATENT OFFICE 2,683,227

ELECTRICAL APPARATUS WITH FLUID COOLED TERMINAL BUSHING

Sterling Beckwith, Wauwatosa, Wis., assignor to Allis-Chalmers Manufacturing Company, Milwaukee, Wis.

Application May 16, 1952, Serial No. 288,269

5 Claims. (Cl. 310—55)

This invention relates in general to fluid cooled electrical apparatus having terminal bushings which are cooled by the fluid of the apparatus, and particularly to a gas cooled dynamoelectric machine having gas cooled terminal bushings.

Improvements in gas cooled dynamoelectric machines, particularly hydrogen cooled machines, have permitted great increases in their power ratings. Terminal bushings for such machines generally had sufficient current carrying capacity to meet these increases. In recent development of gas cooled machines, however, the current carrying capacity of the terminal bushings was becoming a limiting factor to further increase in the power rating of the machines.

It is therefore an object of the present invention to provide electrical apparatus with terminal bushings having an increased current carrying capacity without increasing the size of the bushings.

Another object of the invention is to provide terminal bushings for a gas cooled dynamoelectric machine in which cooling gas is circulated through the bushings.

Other objects and advantages will be apparent to one skilled in the art upon a reading of the following description when taken with the accompanying drawings:

Fig. 1 is a view in longitudinal section of a gas cooled totally enclosed dynamoelectric machine embodying the present invention;

Fig. 2 is a sectional view of a portion of the machine of Fig. 1 taken along line II—II;

Fig. 3 is an enlarged sectional view with a portion broken away of a terminal bushing of Fig. 2 taken along the line III—III;

Fig. 4 is a sectional view taken along the line IV—IV of Fig. 3; and

Fig. 5 is a sectional view taken along the line V—V of Fig. 3.

Referring to the drawing, numeral 6 represents the rotor or rotating field member of a conventional dynamoelectric machine of the hydrogen or air cooled type. The rotor comprises a shaft 7 supported by suitable bearings, not shown, and a magnetic core with an energizing winding in the peripheral portion thereof.

The stator 8 comprises an armature winding 9 supported in a laminated magnetic core mounted in a stationary support. This support comprises a cylindrical shell 10 with its ends welded to radially rigid end rings 11. Spaced from shell 10 is a frame 12 comprising a tubular member 13 with its ends also welded to end rings 11. The stator core is suitably supported intermediate the ends of the tubular member. End bells 14 are removably secured in a suitable known manner to the end rings 11 and their central portions are provided with suitable shaft seals, not shown.

A baffle plate or shield 15 is secured to each end portion of the tubular member 13 and each shield extends radially inward toward the rotor shaft. The central portions of shields 15 extend axially to form housings for fans 16 and 24 mounted on the rotor shaft.

Frame 12 includes radial support plates 17 secured to tubular member 13 intermediate its ends to support longitudinally extending bars 18 on which stator laminations 19 are assembled. Clamping members 20 hold the laminations in assembled position. Adjustable nuts 21 bear against the clamping members 20 and engage threaded ends of stud bolts which extend through members 20 and engage threaded holes in the ends of the bars 18.

The stator core supporting frame 12 includes supply ducts 22 for the ventilating gas. The ducts are inserted in apertures in the radial plates 17 and held in position thereby with the inner edges of the ducts 22 secured to the longitudinal bars 18. These ducts are open at their ends to connect with the space adjacent the ends of the core, and the ducts are open on their radially inner side to connect with radial ventilating passages in the stator core.

The stator core laminations are arranged in groups providing radial ventilating space 23 between groups of the laminations. These spaces 23 extend from the periphery of the core to the air gap and may each be divided in a well known manner into inlet and outlet radial passages by suitable spacer elements disposed between adjacent laminations of adjacent groups. Inlet and outlet passages occur alternately so that inlet passages connect ducts 22 with the air gap, and outlet passages connect the air gap with the space between ducts 22 and the tubular member 13.

Apertures 25 are longitudinally spaced in tubular member 13 between suitable cooling units 26 for the passage of ventilating gas from the space between the ducts and the frame to the space between the frame and the shell and the pair of cooling units.

The cooler units 26 are of a conventional type, extend the full length of the shell and are disposed in the space between the shell and the tubular member and along opposite sides of the row of apertures 25 and in the path of the circumferential travel of the hydrogen.

Armature winding 9 is provided with lead conductors 28 connected to suitable terminal bushings 29. These bushings are suitably mounted in gastight relation in a box like structure 30 which is welded to shell 10 over an opening therein. Box 30 cooperates with end bells 14, end rings 11 and shell 10 to form a housing totally enclosing the machine.

The bushings 29 may be made from standard high voltage bushings which have been adapted for gas cooling. As so adapted, these bushings each comprise suitable insulation such as ceramic material 31 extending through the wall of the housing and suitably mounted in gastight relation therewith. Each bushing comprises a hollow copper stud 32 or tubular conductor having one end within the housing for connecting an armature lead conductor 28 thereto. The other end of stud 32 is disposed outside of the housing to serve as a terminal for the machine. Baffle means 33 disposed within the stud divides the opening therein into parallel passages 34, 35. The baffle means may comprise a coaxial tube but as shown preferably comprises a copper bar which extends substantially the length of the stud and is axially wedged therein. The outside end of the stud is closed in a suitable manner such as by a pair of half moon disks 36 wedged and brazed between the sides of the bar 33 and the inside wall of the stud. Adjacent the outside end of the stud, bar 33 has an opening 37 therethrough which connects passage 34 with passage 35.

The end of stud 32 inside of the housing has a cup shaped cap 39 brazed thereto. A lead conductor 28 is removably secured to cap 39 as by bolts 40 which are countersunk therein to avoid points of corona stress concentration. Lead conductor 28 and cap 39 have aligned apertures made as by drilling to define an entrance port 41 connecting passage 34 with space between shell 10 and tubular member 13. A discharge port connecting passage 35 with the same space between shell 10 and tubular member 13 comprises holes 42 drilled through the side of cap 39 and stud 32.

Means directing ventilating gas from a relatively high pressure gas area into the entrance port of each bushing is provided. Such means comprises a conduit or pipe 43 which extends through the tubular member 13 with one end opening in the relatively high pressure gas area or chamber defined by the tubular member 13, shield 15, and an end of the stator core 19. The conduit 43 may be made of any suitable material and is preferably a length of metal pipe welded to tubular member 13 with its free end 45 spaced a suitable distance from the end of the high voltage bushing to define a gap therebetween. The conduit is secured in position so that the ventilating gas flowing therethrough is directed into entrance port 41 of the bushing. The gap between conduit 43 and its associated high voltage bushing is sufficiently large so that the voltage gradient in the gas space therebetween is below that required for corona. The free end 45 of conduit 43 is enlarged to present a surface which is free of points of corona stress concentration. For use with machines developing low fan pressures, conduit 43 and its associated bushing 29 may be provided with suitable corona shielding to permit a reduced gap between the conduit and the bushing.

During operation of the machine fan 16 and fan 24 each force ventilating gas under relatively high pressure into a space or chamber including the end turns of the stator winding. The ventilating gas flows over the stator end turns, thence into longitudinal ducts 22 to the periphery of the stator core, radially inward through inlet passages 23 to the air gap of the machine, either circumferentially or axially to outlet passages 23 and radially outward through tubular member apertures 25 to the space between shell 10 and tubular member 13 and between a pair of coolers 26. Between the coolers the ventilating gas divides and flows circumferentially in opposite directions through the coolers, then the cooled ventilating gas again divides to flow axially to both ends of the housing into a relatively low pressure space or chamber. With the ventilating gas at a relatively low pressure, it then flows radially inward through ports 44 in the tubular member into fan intake area confined between end bells 14 and shields 15 to reenter fans 16, 24 for recirculation through the machine.

Some of the cool ventilating gas discharged by fan 16 is directed from the relatively high pressure area by pipes 43 as jets of ventilating gas which enter ports 41 of their associated bushings. Because of its relatively high velocity each jet of gas from a pipe 43 entering a port 41 carries with it some of the surrounding cool gas from the low pressure gas area. In each bushing the ventilating gas flows in a series path from port 41 through longitudinal passages 34 and 35 and is discharged through ports 42 into the relatively low pressure area of the machine where it mixes with gas which has circulated through the stator and coolers and is returning to fan 16. Thus ventilating gas flows in direct contact with the current carrying hollow studs of the bushings to dissipate heat therefrom and to greatly increase the current carrying capacity of each bushing.

Athough but one embodiment of the present invention has been shown and described it will be understood that changes and modifications may be made therein without departure from the spirit of the invention or the scope of the appended claims.

It is claimed and desired to secure by Letters Patent:

1. A gas cooled dynamoelectric machine comprising a gastight housing, a rotatable shaft, means forcing ventilating gas into a relatively high pressure gas chamber within said housing from which said ventilating gas is circulated through said machine, a terminal bushing mounted in said housing with one end inside said housing and the other end outside said housing, said bushing including a hollow terminal stud having a baffle mounted therein which forms two longitudinal passages in said stud, the outside end of said stud being closed, said passages being in communication with each other at the outside end of said stud, said inside end of said stud having apertures which connect both said passages to a single relatively low pressure gas chamber within said machine, and means spaced from said bushing directing a free jet of ventilating gas from said high pressure chamber through said low pressure gas chamber into one of said stud passages to cause said gas to flow through said stud by way of one of said passages to the outside end of said stud, and through the other said passage back to the inside end of the stud where the gas discharges into said low pressure gas chamber.

2. A gas cooled dynamoelectric machine comprising a gastight housing, a rotatable shaft, a fan mounted on said shaft at one end of said machine producing a relatively high pressure gas area and a relatively low pressure gas area in circulating said gas through said machine, a terminal bushing mounted in said housing with one end inside said housing and the other end outside said housing, said bushing including a hollow terminal stud having a baffle mounted therein which forms longitudinal passages in said stud, said passages being in communication with each other at the outside end of said stud, said inside end of said stud having apertures which connect said passages to said relatively low pressure gas area, and means spaced from said bushing directing a free jet of ventilating gas from said high pressure gas area through said low pressure gas area into only one of said stud passages to cause said gas to flow through said stud by way of said one of said passages to the outside end of said stud, and through the other said passage back to the inside end of the stud where the gas discharges into said low pressure gas area.

3. A gas cooled dynamoelectric machine comprising a gastight housing, a rotatable shaft, a fan mounted on said shaft at one end of said machine producing a relatively high pressure gas area from which ventilating gas is circulated through said machine, a terminal bushing mounted in said housing with one end inside said housing and the other end outside said housing, said bushing including a tubular conductor and a baffle, said baffle mounted in said conductor to form two longitudinal passages therein, said baffle having an opening therein at the outside end thereof joining said passages in said conductor, said inside end of said conductor having apertures which connect both said passages to a single relatively low pressure gas area within said machine, and conduit means spaced from said bushing directing a free jet of ventilating gas from said high pressure gas area through said low pressure gas area into one of said conductor passages to cause said gas to flow through said conductor by way of said one said passage to the outside end of said conductor, through said opening in said baffle to the other said passage, and through said other passage back to the inside end of said conductor where the gas discharges into said low pressure gas area of said machine.

4. A gas cooled dynamoelectric machine comprising a gastight housing, a stator and a rotatable shaft, a fan mounted on said shaft at one end of said machine for circulating gas through said machine, means defining a relatively low pressure gas chamber adjacent the intake side of said fan, means defining a relatively high pressure chamber receiving gas discharged from said fan, means directing gas from said high pressure chamber, through said stator to said low pressure chamber and back to said fan, a terminal bushing mounted in said housing with one end inside said housing in said low pressure chamber and the other end outside said housing, said bushing including a hollow terminal stud having a baffle mounted therein which forms longitudinal passages in said stud, said passages being in communication at the outside end of said stud, said inside end of said stud having apertures which connect both said passages to said relatively low pressure gas chamber within said machine, and means spaced from said bushing directing a free jet of ventilating gas from said relatively high pressure chamber of said machine through said low pressure gas chamber into only one of said stud passages to cause said gas to flow through said stud by way of said one of said passages to the outside end of said stud and through the other said passage back to the inside end of the stud where the gas discharges into said low pressure gas chamber.

5. A gas cooled electric apparatus comprising a gastight housing, means forcing ventilating gas into a relatively high pressure gas chamber within said housing from which ventilating gas is circulated through said apparatus, a terminal bushing mounted in said housing with one end inside said housing and the other end outside said housing, said bushing including a hollow terminal stud having a baffle mounted therein which forms two longitudinal passages in said stud, the outside end of said stud being closed, and said baffle having an opening therethrough at the outside end thereof for joining said passages in said stud, said inside end of said stud having apertures which connect said passages to a single relatively low pressure gas chamber within said apparatus, and means spaced from said bushing directing a free jet of ventilating gas from said high pressure gas chamber through said low pressure gas chamber into one of said stud passages to cause said ventilating gas to flow through said stud by way of said one of passages to the outside end of said stud, through said opening in said baffle to the other said passage and through said other passage back to the inside end of the stud where the ventilating gas discharges into said low pressure gas chamber.

References Cited in the file of this patent

UNITED STATES PATENTS

| Number | Name | Date |
|---|---|---|
| 2,285,199 | Freiburghouse | June 2, 1942 |
| 2,372,135 | Sterrett | Mar. 20, 1945 |

FOREIGN PATENTS

| Number | Country | Date |
|---|---|---|
| 443,017 | Great Britain | Feb. 18, 1936 |